(12) United States Patent
Shackelford

(10) Patent No.: US 8,661,970 B2
(45) Date of Patent: *Mar. 4, 2014

(54) MULTI-WELL FOOD PRESENTATION MODULES

(71) Applicant: Low Temp Manufacturing Company, Jonesboro, GA (US)

(72) Inventor: Howell B. Shackelford, Griffin, GA (US)

(73) Assignee: Low Temp Manufacturing Company, Jonesboro, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,449

(22) Filed: Oct. 18, 2012

(65) Prior Publication Data

US 2013/0037237 A1  Feb. 14, 2013

Related U.S. Application Data

(63) Continuation of application No. 12/139,629, filed on Jun. 16, 2008, now Pat. No. 8,307,761.

(51) Int. Cl.
*A23L 3/00* (2006.01)
*A23L 3/005* (2006.01)

(52) U.S. Cl.
USPC ............... 99/470; 99/468; 426/520; 426/524

(58) Field of Classification Search
USPC ........ 426/520, 524; 62/258; 99/468, 470, 483
See application file for complete search history.

(56) References Cited

U.S. PATENT DOCUMENTS

| | | | | |
|---|---|---|---|---|
| 3,308,633 | A | * | 3/1967 | Kritzer, Jr. ............... 62/239 |
| 3,780,794 | A | | 12/1973 | Staub |
| 3,952,794 | A | * | 4/1976 | Spanoudis ............... 165/58 |
| 4,052,589 | A | | 10/1977 | Wyatt |
| 4,997,030 | A | | 3/1991 | Goto et al. |
| 5,910,210 | A | | 6/1999 | Violi et al. |
| 5,941,077 | A | | 8/1999 | Safyan |
| 5,992,411 | A | | 11/1999 | Ayot et al. |
| 6,279,470 | B2 | | 8/2001 | Simeray et al. |

(Continued)

FOREIGN PATENT DOCUMENTS

| | | |
|---|---|---|
| WO | 9733130 A1 | 12/1997 |
| WO | 9837797 A1 | 9/1998 |
| WO | 9853260 A1 | 11/1998 |
| WO | 2007063294 | 6/2007 |

OTHER PUBLICATIONS

Babble. "Strollerderby: Kitchen", 1940, pp. 1-4. http://blogs.babble.com/strollerderby/2012/11/12/from-ice-box-to-sub-zero-the-evolution-of-the-kitchen-from-1900-2012-photos/#1950.*

(Continued)

*Primary Examiner* — Nikki H Dees
*Assistant Examiner* — Stephanie Cox
(74) *Attorney, Agent, or Firm* — Kristin M. Crall; Dean W. Russell; Kilpatrick Townsend & Stockton LLP

(57) ABSTRACT

Thermally convertible food presentation modules are described. A single module may be used for both heating and refrigeration of foodstuffs as desired at any given time. Any well of a module may be switched between heating and cooling of food regardless of the status of any other well of the module.

26 Claims, 4 Drawing Sheets

(56) References Cited

U.S. PATENT DOCUMENTS

| | | |
|---|---|---|
| 6,539,846 B2 | 4/2003 | Citterio et al. |
| 6,735,971 B2 | 5/2004 | Monroe et al. |
| 6,910,347 B2 | 6/2005 | Monroe et al. |
| 7,028,498 B2 | 4/2006 | Monroe et al. |
| 7,105,779 B2 | 9/2006 | Shei |
| 7,227,102 B2 | 6/2007 | Shei |
| 8,307,761 B1 | 11/2012 | Shackelford et al. |
| 2004/0020915 A1 | 2/2004 | Shei |
| 2004/0069766 A1* | 4/2004 | Haasis et al. .................. 219/433 |
| 2005/0023462 A1 | 2/2005 | Rosenman et al. |
| 2005/0217298 A1* | 10/2005 | Monroe et al. .................. 62/258 |
| 2005/0255208 A1 | 11/2005 | Shei et al. |
| 2007/0210055 A1 | 9/2007 | Konrad |

OTHER PUBLICATIONS

*Notice of Allowance dated Oct. 3, 2012 in U.S. Appl. No. 12/139,629.
Supplemental Response dated Sep. 14, 2012 in U.S. Appl. No. 12/139,629.
Response dated Aug. 29, 2012 in U.S. Appl. No. 12/139,629.
Office Action dated Mar. 1, 2012 in U.S. Appl. No. 12/139,629.
Response dated Jan. 5, 2012 in U.S. Appl. No. 12/139,629.
Office Action dated Aug. 5, 2011 in U.S. Appl. No. 12/139,629.

* cited by examiner

MULTI-WELL FOOD PRESENTATION MODULES

CROSS-REFERENCE TO RELATED APPLICATION

This application is a continuation application of U.S. Ser. No. 12/139,629 filed on Jun. 16, 2008, now allowed, the contents of which are incorporated herein by reference.

FIELD OF THE INVENTION

This invention relates to multi-well food presentation modules and more particularly, although not necessarily exclusively, to generally immobile food serving bars in which each well may be controllable thermally independent of other wells and may alternately be refrigerated or heated. Each well may receive one or more pans containing edible products, with such products presented so as to be accessible to persons utilizing the bars.

BACKGROUND OF THE INVENTION

U.S. Pat. No. 6,279,470 to Simeray, et al. describes a portable serving system designed especially for "restaurants that provide meals for pick up or delivery." See Simeray, col. 1, ll. 23-24. The system includes a tray, various dish plates, and a cover. Electric heating may be employed to maintain elevated temperature of food intended to be served at above-ambient temperature. Likewise, electricity may be used to evacuate residual heat from portions of the tray to reduce food temperatures toward ambient.

Another portable food-delivery device is illustrated in U.S. Pat. No. 6,539,846 to Citterio, et al. Pre-filled dishes placed in distinct bays (seats) of a tray contact "thermal energy transfer devices" intended, apparently, either to heat or to cool the dishes. See Citterio, col. 4, ll. 38-44. A person responsible for delivering meals may roll the device on its wheels and access dishes via a door, which otherwise remains closed.

Non-portable food presentation equipment conventionally is dedicated either to heating or to cooling food contained therein. One such mechanism is described in U.S. Patent Application Publication No. 2008/0023462 of Shei, et al. The food-holding unit of FIG. 1, for example, heats multiple food trays, whereas the unit of FIG. 26 refrigerates the trays. Neither unit both heats and cools, however.

U.S. Pat. No. 6,735,971 to Monroe, et al. shows another non-portable food-presentation device in the form of a multi-well serving bar. At with the food-holding unit of the Shei application, the serving bar of the Monroe patent is dedicated either to heating or to cooling all wells. See Monroe, col. 7, ll. 10-22. Further, such dedicated heating or cooling is preferably uniform as to food contained therein rather than individually controlled. See id., col. 1, ll. 19-28. Although the dedicated refrigerated version of the device may incorporate electric heating elements, such elements are used solely "[t]o prevent over-cooling"—rather than to elevate food temperatures above ambient. See id., col. 5, ll. 14-22. The contents of the Simeray, Citterio, and Monroe patents and of the Shei publication are incorporated herein in their entireties by this reference.

Dine-in, self-service restaurants in particular utilize multi-well food bars such as those illustrated in the Monroe patent. Often, however, providing uniform food temperatures from well to well may be undesirable. As but one example, hard tacos typically include heated meat and refrigerated lettuce, cheese, and other substances placed together in an ambient-temperature corn tortilla shell. These components cannot be placed in adjacent wells of a dedicated food-presentation module, as at least one such component will be served at an undesired (and perhaps unsanitary) temperature. Moreover, even placing tortilla shells adjacent either (heated) meat or (refrigerated) vegetables or dairy products would be problematic if the wells are uniformly heated or cooled.

Smaller dine-in establishments, furthermore, if required to purchase two dedicated modules (one for heated foods and a second for refrigerated foods) may resultingly underutilize the modules. This consequence is especially likely when no more than the number of bays in a single module is needed but some bays would need to contain hot food and the others refrigerated food. Eating establishments of all sizes may, from time to time, also desire to switch a bay from heating to cooling (or vice-versa) depending on time of day. For example, a bay heated for purposes of serving hot breakfast food might be best-utilized at lunch to hold refrigerated foodstuffs, an impossibility with a conventional food bar.

SUMMARY OF THE INVENTION

The present invention solves these difficulties associated with existing food presentation modules. Innovative modules of the invention—as well as their individual food-containing wells—are convertible thermally as a function of time. Hence, a single module may be utilized for both heating and refrigeration of foodstuffs as desired at any given time. Any well, furthermore, may be switched between heating and cooling of food, regardless of the status of any other well. Clearly, then, modules of the present invention resolve the taco-presentation type problem described earlier, as adjacent wells of a module may contain, respectively, ambient-temperature items (such as tortilla shells), heated items (such as meat), and refrigerated items (such as lettuce and cheese).

A preferred module includes four wells each approximately twenty inches long, twelve inches wide, and six inches deep. Each well is isolated thermally from adjacent wells and has an independently-controlled heating and cooling system. Advances in thermal insulation permit as little as three inches of spacing to exist between wells, reducing the overall length of the module while maintaining compliance with Standard Nos. 4 (heating) and 7 (refrigeration) of the National Sanitary Foundation (NSF). Indeed, tests confirm that a version of the present invention allows a temperature of 150° F. in one well while concurrently maintaining an adjacent well at no greater than 10° F. Those skilled in the art will recognize that modules may be constructed of any number of wells spaced by varying amounts yet still provide satisfactory results, so that the present invention is not limited by any of these characteristics.

Modules of the present invention also are versatile. They function in conjunction with each of mechanical heat sources, mechanical refrigeration, and ice cooling (i.e. wet). They also operate when dry.

Wells of the invention may, advantageously, not be completely flat bottomed. Instead, some preferred well floors are sloped so that a high point (or area) exists. These high points are designed to dry first if the well has been subjected to liquid. The slope also may direct liquid toward one or more drains from the well.

Heating elements comprising silicone rubber (or similar) blankets may be especially useful as part of the present invention. Such blankets may be Vulcanized or otherwise attached to well floors, capturing electrical-resistance heating mechanisms therebetween. Heat distribution to the wells via the blankets may be much more efficient than in conventional devices, thereby reducing heat leakage to adjacent wells.

It thus is an optional, non-exclusive object of the present invention to provide thermally convertible food presentation modules.

It is an additional optional, non-exclusive object of the present invention to provide individually-convertible wells within a food presentation module.

It is another optional, non-exclusive object of the present invention to provide adjacent wells of a food presentation module whose temperatures may differ significantly at a given time.

It is a further optional, non-exclusive object of the present invention to provide wells of a food presentation module having independently-controlled heating and cooling systems.

It is also an optional, non-exclusive object of the present invention to provide food presentation modules operable wet or dry.

It is, moreover, an optional, non-exclusive object of the present invention to provide wells whose floors or bottoms are not flat.

It is yet another optional, non-exclusive object of the present invention to provide food presentation modules in which electrical-resistance heating mechanisms may be captured between well floors and silicone rubber (or similar) blankets attached to the floors.

Other objects, features, and advantages of the present invention will be apparent to those skilled in appropriate fields with reference to the remaining text and the drawings of this application.

DETAILED DESCRIPTION

Detailed in FIGS. 1-5 is food presentation module 10 of the present invention. As depicted, module 10 includes a frame 12 having a generally planar upper surface 14 from which multiple wells 18 (see FIG. 6) depend. Although module 10 is shown as having four such wells 18A-D, more or fewer wells 18 may be incorporated instead. Adjacent wells 18 typically are spaced distance D1 along length L of module 10, with D1 preferably being approximately three inches and L preferably being approximately fifty-eight and one-half inches. Again, however, values of D1 and L different from these preferred values may be selected. (Indeed, although the value of D1 preferably is uniform between adjacent wells 18 of a module 10, it need not necessary be uniform and instead may vary along length L.)

Figure 6:
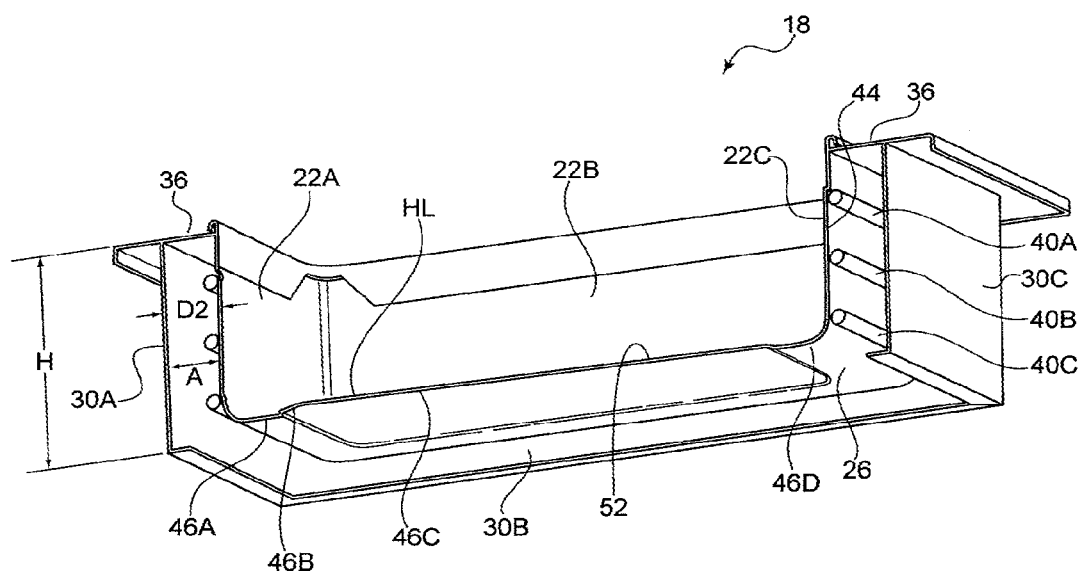
FIG. 6 is a perspective, cut-away view of a well of the module of FIG. 1.

FIG. 6 illustrates, in cross-section, certain aspects of well 18. Well 18 may comprise generally vertically-extending interior walls 22 connected by bottom or floor 26. Four such walls 22 typically are present in well 18, with three (22A-C) of the four shown in FIG. 6. Well 18 additionally may comprise four exterior walls 30, again with three (30A-C) of these walls being shown in FIG. 6. Each exterior wall 30 preferably is spaced a distance D2 from its corresponding interior wall 22 so as to form an insulative air gap A therebetween. A preferred value for D2 is two inches, although it may differ from the preferred value as desired. Upper surface 36 may interconnect the various interior and exterior walls 22 and 30, respectively. Additionally, well 18 preferably—although not necessarily—is formed of stainless steel. Because each well 18 lacks a lid or door, bulk food placed therein is (intentionally) exposed to the ambient environment for easy access by consumers.

Positioned within air gap A may be one or tubes coils or pipes 40. Such pipes 40 advantageously contact external sides 44 of interior walls 22 for more efficient transfer of thermal energy between the pipes 40 and well 18. Three pipes 40A-C are depicted in FIG. 6 spaced along height H of well 18, although greater or fewer such pipes 40 may be employed instead. Likewise, although pipes 40A-C preferably are made of copper and approximately one-half inch in diameter, other materials and sizes may be utilized instead.

Also detailed in FIG. 6 is the non-flat nature of floor 26. Floor 26 may comprise multiple areas 46A-D, with areas 46A and 46D being generally flat. Between areas 46A and 46D, in area 46B floor 26 rises to its highest level (at HL) before sloping in area 46C down to the level of area 46D. One or more drains preferably is located in area 46D of floor 26 so as to allow fluid to exit well 18.

Attached to interior surface 48 of floor 26 may be thermal blanket 52. Blanket 52 beneficially is made of silicone rubber so as to provide good heat transfer therethrough. Other heat conducting materials may be used instead, however. A Vulcanization process is preferred for attaching blanket 52 to floor 26, although other processes or connection mechanisms may be employed.

Captured between blanket 52 and floor 26 is at least one heating mechanism, preferably an electrical-resistance type element. Blanket 52 disperses heat from the element into well 18 relatively efficiently and uniformly, reducing likelihood of substantial heat leakage into adjacent wells 18. Similarly, air gaps A help reduce thermal leakage (from either or both of blanket 52 and pipes 40) from a well 18 into adjacent wells.

Figure 1:
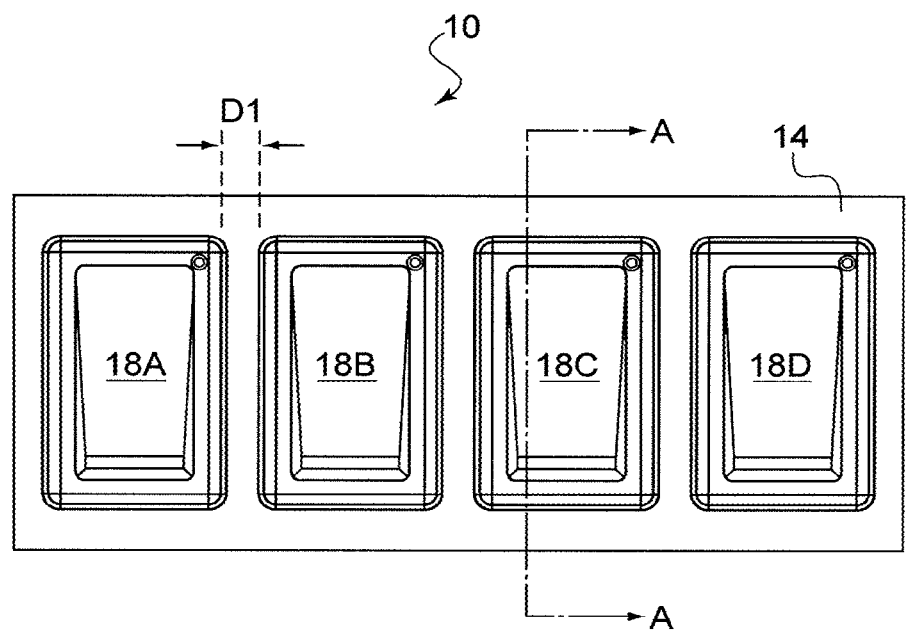
FIG. 1 is a top view of an exemplary food presentation module of the present invention.
Figure 4:
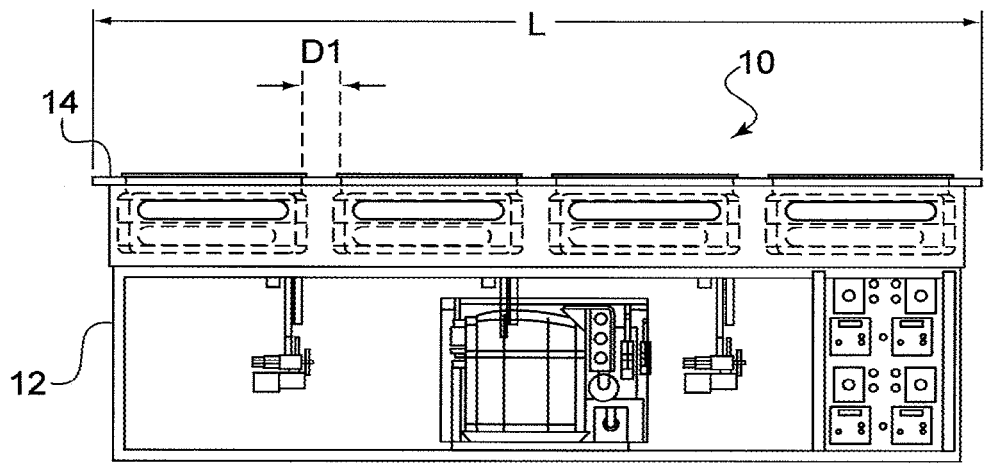
FIG. 4 is a front elevational view of the module of FIG. 1.
Figure 2:
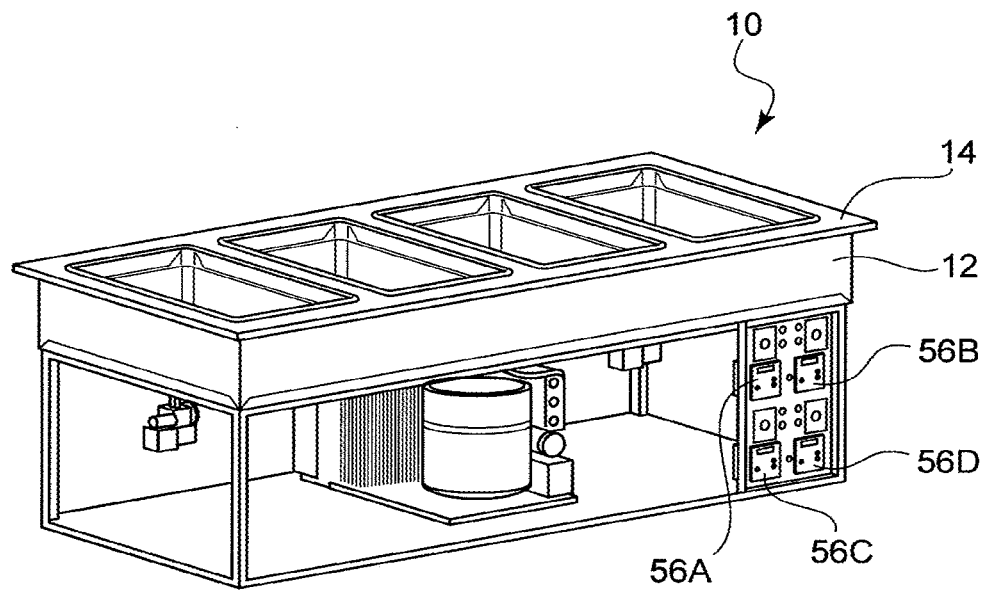
FIG. 2 is a perspective view of, principally, the front of the module of FIG. 1.
Figure 3:
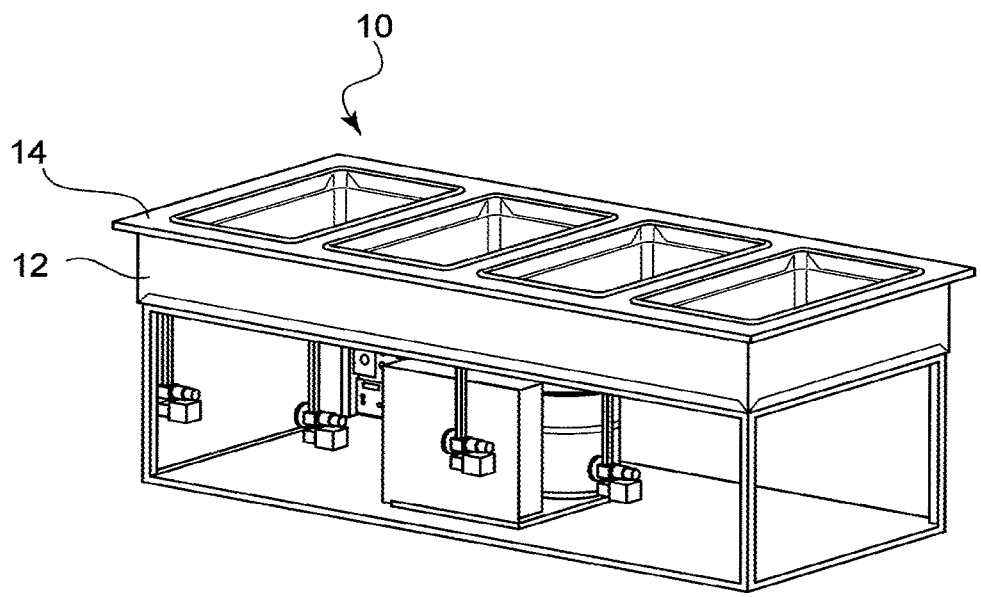
FIG. 3 is a perspective view of, principally, the rear of the module of FIG. 1.
Figure 5:
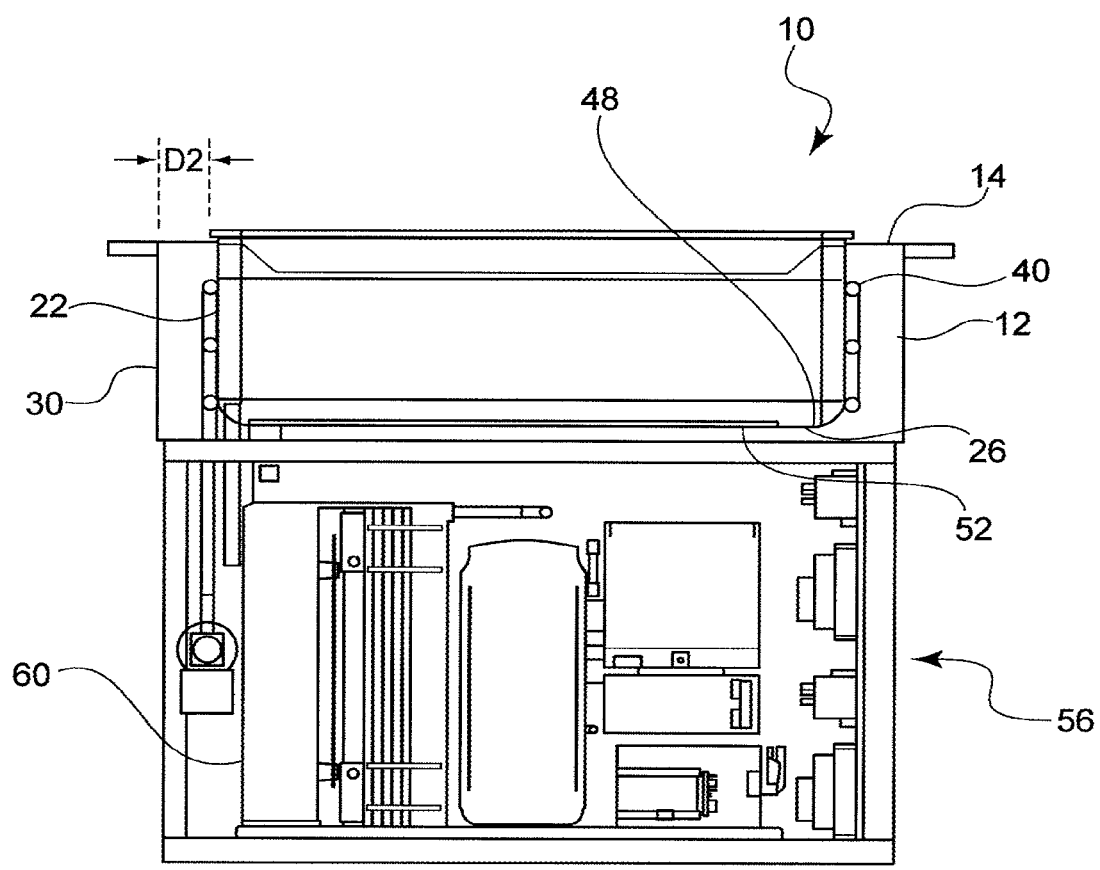
FIG. 5 is a cross-sectional view taken along line A-A of FIG. 1.

Heating and cooling of any well 18 may occur regardless of the thermal status of any other well 18 within module 10. Electronic system controls 56 exist for each well 18 of a module 10. FIG. 2 illustrates an exemplary interface plate for four controls 56A-D, with one control present for each of wells 18A-D.

Hence, if a particular well (e.g. well 18A) of module 10 is to be heated, its associated control 56A may be used to connect the heating element in floor 26 of well 18A to a source of electricity. Such source typically will be an electrical outlet of the building housing module 10, although it conceivably could be a battery or other source located within module 10 itself.

Conversely, if the particular well 18A is to be cooled, control 56A may be employed to operate condensing unit 60 in a manner causing refrigerant to flow through pipes 40 contacting interior walls 22 of the well 18A. Normally only one condensing unit 60 is needed for a module 10; in such case, it need merely be configured so that valving precludes refrigerant flow through pipes 40 not intended to be actively cooling at any given time. Controls 56A-D may, if desired, display or otherwise provide real-time temperature information about their corresponding wells 18A-D. Also if desired, they additionally may prevent concurrent heating and cooling of a well 18 so as to avoid inadvertent waste of energy.

In at least one version of module 10, well 18 has dimensions of approximately 12"×20"×6" and is designed to receive a foodstuff-containing pan. Consistent with various standards such Nos. 4 and 7 of the NSF, each well 18 readily may maintain the foodstuff at 150° F. (for product needing to be heated) or at 41° F. (for product needing to be refrigerated). Indeed, tests indicate that, with one well 18 maintaining foodstuff at 150° F., an adjacent well 18 may maintain cold food at 10° F. or less.

Module 10 thus provides a versatile, multi-purpose device capable of simultaneously presenting hot food, cold food, and combinations thereof in bulk for ready access by consumers, who select portions of the food for placement on their individual plates. Further, module 10 may in some cases be employed for purposes other than food presentation. Indeed, module 10 may be useful in presenting other materials that need heating or cooling. Preferably, module 10 has its positioned fixed and is generally immobile in use, although it may include castors or wheels enabling its movement between uses.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A food presentation module generally immobile in use, comprising:
    a. a frame;
    b. at least two wells for receiving containers of bulk food, the wells being uncovered in use so as to expose food received therein to the ambient environment, each well being thermally isolated from other wells; and
    c. a system for controlling temperatures of the at least two wells independently, wherein temperatures of the wells may be switched between heating and refrigerating, regardless of the temperature of the other well such that food received in the first well may be refrigerated to a temperature substantially below ambient while food received in a the second well may be heated to a temperature substantially above ambient, food received in the first well may be heated to a temperature substantially above ambient while food received in the second well may be refrigerated to a temperature substantially below ambient, both wells may be heated, or both wells may be refrigerated.

2. A module according to claim 1, further comprising a third well for receiving a container of food and in which the temperature-control system-controls temperature of the third well independently of temperatures of the first and second wells.

3. A module according to claim 1, in which each of the first and second wells defines a floor, further comprising a thermal blanket attached to each floor.

4. A module according to claim 3 in which each thermal blanket comprises silicone rubber.

5. A module according to claim 4 in which each floor is sloped so as to direct any fluid otherwise tending to accumulate on the floor toward an exit for draining.

6. A module according to claim 1, further comprising a heating element attached to a floor of each of the wells.

7. A module according to claim 1, in which each of the first and second wells further defines a plurality of generally vertically-extending walls, further comprising at least one pipe contacting each wall, such at least one pipe configured to contain refrigeration fluid.

8. A module according to claim 7 in which each of the first and second wells further comprises a plurality of generally vertically-extending exterior walls spaced from the plurality of vertically-extending walls so as to form insulative gaps therebetween.

9. A module according to claim 1, in which the first and second wells are spaced by a distance of only approximately three inches.

10. A method of presenting food for consumption by a plurality of persons, the method comprising:
    a. providing a fixed-position food presentation module comprising a frame and at least first and second wells for receiving containers of food, such wells being uncovered so as to expose the food containers to the ambient environment; and
    b. heating the first well while simultaneously refrigerating the second well, refrigerating the first well while simultaneously heating the second well, heating both wells, or refrigerating both wells.

11. A method according to claim 10 in which temperature of food received in the first well is maintained at temperature of at least 150° F. while temperature of food received in the second well is maintained at temperature of no more than 41° F.

12. A food presentation module, comprising:
    a. a frame;
    b. at least first and second wells for receiving containers of bulk food, the first and second wells being thermally isolated from one another and each having (1) an electrical-resistance heating mechanism secured thereto and (2) one or more refrigerant pipes secured thereto;
    c. a condensing unit to cause refrigerant to flow through the one or more refrigerant pipes; and
    d. a temperature controlling system that controls temperatures of the first and second wells independently, wherein the temperature of the first or second well may be switched between heating and refrigerating regardless of the temperature of the other of the first or second well, such that both wells may be heated, both wells may be refrigerated, the first well may be heated while the second well is refrigerated, or the second well may be heated while the first well is refrigerated.

13. The food presentation module of claim 12, further comprising at least a third well for receiving a container of food and in which the temperature controlling system controls the temperature of the third well independently of temperatures of the first and second wells.

14. A food presentation module for both heating and refrigeration of foodstuffs at any given time, comprising:
    a. at least two wells configured for receiving containers of food for maintaining desired temperatures of the food, the wells being thermally isolated from one another and each having (1) an electrical-resistance heating mechanism secured thereto and (2) one or more refrigerant pipes secured thereto;
    b. a frame for housing the at least two wells, the frame comprising a condensing unit to cause refrigerant to flow through the one or more refrigerant pipes and a system control for each well;
    wherein each of the at least two wells may be independently switched between heating and cooling, such that each well can independently heat or cool food, regardless of the temperature of any other well.

15. The food presentation module of claim 14, further comprising at least a third well for receiving a container of food and in which the temperature controlling system controls the temperature of the third well independently of temperatures of the first and second wells.

16. The food presentation module of claim 14, wherein the one or more refrigerant pipes are positioned along external sides of the well.

17. The food presentation module of claim 16, wherein the one or more refrigerant pipes are positioned horizontally along external sides of the well.

18. The food presentation module of claim 14, wherein each of the wells comprises an integral surface that is continuous from a vertical wall to a horizontal floor.

19. The food presentation module of claim 14, wherein the electrical-resistance heating mechanism is secured to a floor of the well.

20. A food presentation module, comprising:
   a. at least two wells configured for receiving containers of food, the wells being thermally isolated from one another and each having (1) an electrical-resistance heating mechanism secured thereto and (2) one or more refrigerant pipes associated therewith; and
   b. an independent electronic control system for each well, wherein the control system allows each well to be switched between heated or cooled and prevents concurrent heating and cooling of a single well.

21. The food presentation module of claim 20, further comprising at least a third well or a fourth well.

22. The food presentation module of claim 20, wherein each of the at least two wells may be independently switched between heating and cooling, such that each well can independently heat or cool food, regardless of the temperature of another well.

23. A food presentation module, comprising:
   a. at least two wells configured for receiving bins of food;
   b. an electronic control system for each well, wherein the control system allows each well to be independently switched between heated or cooled and prevents concurrent heating and cooling of a single well;
   c. a frame for housing the at least two wells and the electronic control system, the frame further comprising a condensing unit that causes refrigerant to flow through one or more refrigerant pipes associated with a particular well when the electronic control system for that well is set to refrigerate the well,
   wherein in use, bins of food to be heated or cooled are positioned in one or both of the at least two wells.

24. A food presentation module generally immobile in use, comprising:
   a. a frame;
   b. at least one well for receiving a container of bulk food, the at least one well being thermally isolated from the atmosphere, the at least one well having (1) an electrical-resistance heating system and (2) one or more refrigerant pipes associated therewith; and
   c. a system for controlling various temperature of the at least one well, wherein temperatures of the well may be switched between heating and refrigerating.

25. The A food presentation module of claim 20, further comprising:
   c. a frame for housing the at least two wells and the electronic control system, the frame further comprising a condensing unit that causes refrigerant to flow through the one or more refrigerant pipes of either the first or second well when the electronic control system for that well is set to refrigerate the well.

26. The food presentation module of claim 23, wherein the wells are thermally isolated from one another and each has (1) an electrical-resistance heating system and (2) one or more refrigerant pipes associated therewith.

* * * * *